W. L. SHIGLEY.
Belt-Fastener.

No. 214,528. Patented April 22, 1879.

Attest:
John W. Myers
Alexander Scott

Inventor:
Wm L. Shigley

UNITED STATES PATENT OFFICE.

WILLIAM L. SHIGLEY, OF JAMESTOWN, OHIO.

IMPROVEMENT IN BELT-FASTENERS.

Specification forming part of Letters Patent No. 214,528, dated April 22, 1879; application filed March 22, 1879.

*To all whom it may concern:*

Be it known that I, WILLIAM L. SHIGLEY, of Jamestown, in the county of Green and State of Ohio, have invented certain new and useful Improvements in Belt-Fasteners; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention relates to belt-fasteners; and consists in the construction, combination, and arrangement of parts, as hereinafter set forth and claimed.

Figure 1:
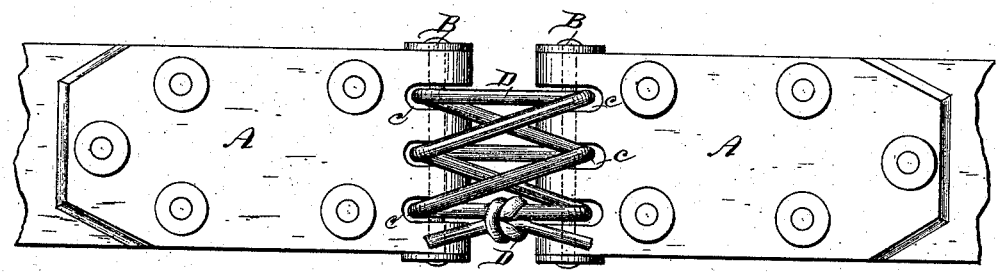
Figure 2:
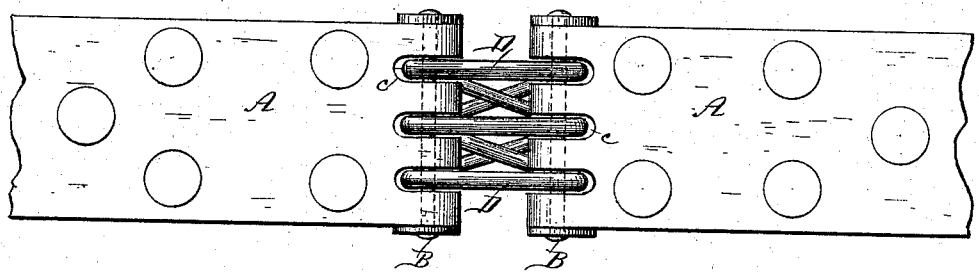
Figure 3:
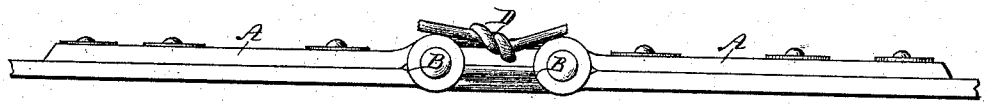

In the accompanying drawings, Figure 1 represents a side elevation of my belt-fastener, showing the folded ends of the belt. Fig. 2 represents the same viewed from the side opposite to said folded ends; and Fig. 3 represents an edge view of the belt, showing the bolt ends and lacing.

In said drawings, A designates the ends of the belt, which ends are of similar construction, and are folded back and secured by rivets, as shown in Fig. 1. The folds of these ends inclose transverse rods or bolts B. (Shown in dotted lines in Figs. 1 and 2.) Each end of the belt has one of these transverse rods, and is also provided with a series of perforations, $c$, each arranged to cross the line of said bolt and extending behind the same.

D designates a leather thong or lacing, which is passed through holes $c$ and laced, as shown. It is then tied, as shown, or fastened in any other convenient manner, so as to prevent unlacing.

Each bolt B is provided at each end with a suitable washer or other stop, to prevent it from dropping out of the belt or being accidentally displaced in any way. These washers, stops, or enlargements of said transverse rods prevent the lacing D from coming into contact with the belt-wheels and being worn thereby. Said lacing is further protected by being allowed to sink into the holes or recesses $c$ of the said belt.

It is apparent that by unlacing, relacing, and tying, or simply untying and loosening, or tightening and then retying, the ends of the belt can readily be brought closer together or allowed to separate farther. This will compensate for any changes in the length of the belt due to variations of temperature; also for any stretching caused by overstrain or prolonged use.

The bolts or rods B effectually guard the ends of the belt from being torn by the great strain which would be brought upon the material if the lacing were simply through unguarded holes in said ends. The strain is also distributed through the entire width of the belt. The said rods B being smooth and readily turning in said belt ends, the friction of the lacing upon them will be comparatively light.

Although I have described said lacing as composed of leather, other material may be employed. Various other changes may also be made in my devices above described without exceeding or avoiding the spirit and scope of my invention.

Having thus fully described the said invention, what I claim as new, and desire to secure by Letters Patent, is—

The combination, with the perforated folded ends A of a belt, of rods B, provided with enlarged ends or washers and thong or lacing D, substantially as and for the purpose set forth.

In testimony that I claim the foregoing as my own I affix my signature in presence of two witnesses.

WM. L. SHIGLEY.

Witnesses:
W. H. BABCOCK,
JOHN W. MYERS.